United States Patent
Szabo et al.

(10) Patent No.: US 6,755,675 B2
(45) Date of Patent: Jun. 29, 2004

(54) FLUID QUICK CONNECTOR WITH SECURE ELECTRICAL GROUND CONTACT

(75) Inventors: George Szabo, Ortonville, MI (US); David S. Malone, Attica, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 110 days.

(21) Appl. No.: 10/010,292

(22) Filed: Nov. 12, 2001

(65) Prior Publication Data

US 2003/0092316 A1 May 15, 2003

(51) Int. Cl.[7] .................................................. H01R 4/60
(52) U.S. Cl. ........................................ 439/191; 439/577
(58) Field of Search ................................ 439/191, 192, 439/194, 195, 180, 577

(56) References Cited

U.S. PATENT DOCUMENTS

| | | | | |
|---|---|---|---|---|
| 3,891,290 A | | 6/1975 | Marshall | 439/192 |
| 4,107,452 A | * | 8/1978 | Razvi | 174/84 S |
| 4,445,734 A | * | 5/1984 | Cunningham | 439/194 |
| 4,659,870 A | | 4/1987 | Jones | 174/848 |
| 4,913,657 A | * | 4/1990 | Naito et al. | 439/192 |
| 4,953,636 A | * | 9/1990 | Mohn | 166/65.1 |
| 4,969,837 A | * | 11/1990 | Genoa et al. | 439/191 |
| 5,059,747 A | | 10/1991 | Bawa et al. | 174/65 |
| 5,076,920 A | | 12/1991 | Danowski et al. | 210/243 |
| 5,164,879 A | | 11/1992 | Danowski et al. | 361/215 |
| 5,524,673 A | | 6/1996 | Noone et al. | 138/103 |
| 5,658,159 A | * | 8/1997 | Gardner et al. | 439/294 |
| 5,743,304 A | | 4/1998 | Mitchell et al. | 138/137 |
| 5,951,063 A | | 9/1999 | Szabo | 285/303 |

* cited by examiner

*Primary Examiner*—Tulsidas C. Patel
(74) *Attorney, Agent, or Firm*—Young & Basile, P.C.

(57) ABSTRACT

An electrically conductive quick connector housing is matable with a conductive male endform. A contact member is carried in the housing to provide a secure electrical connection between the male endform and the housing. In one aspect, the contact member is in the form of at least one projection integrally formed with the housing and extending radially inward into a bore in the housing for engagement with the male endform. In another aspect, the contact member is in the form of at least one longitudinally extending finger projecting unitarily into the bore in the housing. The finger engages the outer diameter of the male endform when the male endform is inserted into the housing.

12 Claims, 3 Drawing Sheets

FLUID QUICK CONNECTOR WITH SECURE ELECTRICAL GROUND CONTACT

BACKGROUND

The present invention relates, in general, to fluid quick connectors which couple male and female connector components.

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable, retainer, the retainer is mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs in the housing.

Radially displaceable retainers are also known in which the retainer is radially displaceable through aligned bores or apertures formed transversely to the main throughbore in the female component housing. The radially displaceable retainer is typically provided with a pair of depending legs which are sized and positioned to slip behind the radially upset portion or flange on the male conduit only when the male connector or conduit is fully seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

In certain fluid flow applications, such as vehicle fuel delivery systems, the fast flowing fuel creates a static electric charge which must be dissipated to minimize the danger of explosion. Multi-layer tubes containing an internal electrically conductive layer have been provided for conducting any static charge buildup to an electrical ground connection to thereby dissipate the static charge. In such applications, the housing of quick connectors have been formed with conductive materials to complete a static charge conductive path between the conductive layer in the multi-layer tube connected to one end of the housing and the typically metal or conductive plastic male endform or conduit inserted into the other end of the connector housing.

However, a reliable, continual contact between the endforms and the inner surfaces of the conductive quick connect housing is not always possible due to manufacturing tolerances. This results in intermittent electrical contact which can lead to built up static electricity in the fuel system which, in turn, increases the opportunity for an explosion.

Thus, it would be desirable to provide a quick connector which maintains secure electrical contact with an internally received electrically conductive conduit.

SUMMARY

The present invention is a fluid quick connector formed of a housing which is matable with a male endform. Both the quick connector housing and the male endform are preferably formed of an electrically conductive material. A contact member is carried in the connector housing and is engagable with the male endform when the male endform is inserted into the housing to provide a secure electrical connection between the male endform and the housing.

In one aspect, the contact member is in the form of at least one and, optionally, a plurality of radially inward extending projections carried in the housing, preferably unitarily with the housing. The projections extend into the bore through the housing and are positioned to engage the outer surface of the male endform when the male endform is inserted into the bore in the housing.

In another aspect, the contact member is in the form of at least one and, optionally, a plurality of circumferentially spaced fingers extending longitudinally into the bore of the housing. The fingers are unitarily formed on the housing. The inner diameter between the contact fingers is less than the outer diameter of the male endform to enable the contact fingers to securely engage the male endform when the male endform is inserted into the housing.

Both aspects of the present invention uniquely provide a secure, non-intermittent electrical contact or path between the conductive male endform and the inner diameter of the conductive housing. This assures that static charge does not build up in the fuel system, in the case of the application of the quick connector in a vehicle fuel delivery system. The contact member assures a continuous electrical contact between the male endform and the housing thereby avoiding the intermittent contact afforded by previous quick connector housing to male endform connections.

The contact member also minimizes the problem encountered with previous attempts to provide an electrical ground path through the quick connector which required the removal or stripping of a significant portion of the plastic coating on the plastic coated metal endform to assure a ground path. This prior design reduces the corrosion resistence afforded the endform by the plastic coating. The present contact member assures a permanent electrical ground path as well as maintaining a high level of corrosion resistence since only a limited amount of plastic coating must be removed from the male endform or broken through by the projections.

BRIEF DESCRIPTION OF THE DRAWING

The various features, advantages and other uses of the present invention will become more apparent by referring to the following detailed description and drawing in which.

DETAILED DESCRIPTION

Figure 1:
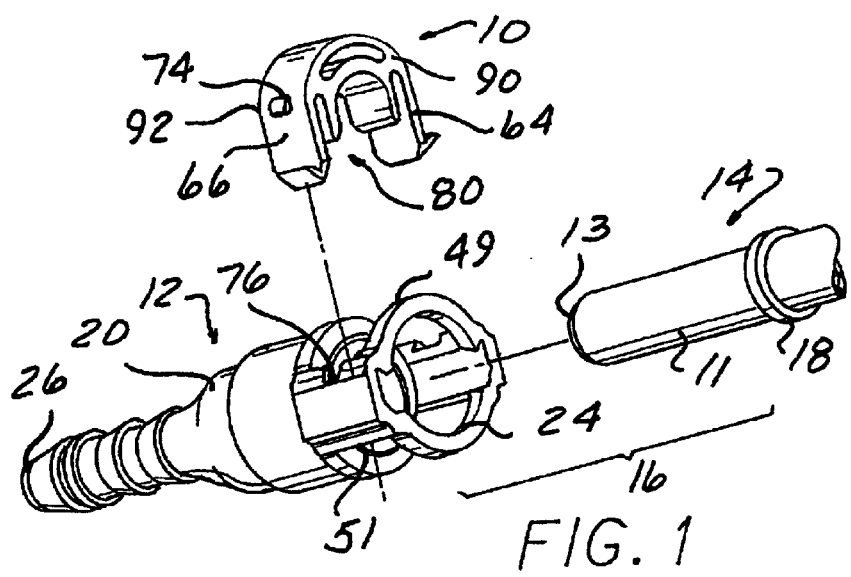
FIG. 1 is an exploded, perspective view of a quick connector according to the present invention.

For clarity in understanding the use and operation of the present invention, reference will first be had to FIGS. 1–5 which depict a retainer 10 which lockingly couples female and male components 12 and 14, respectively, of a quick connector 16.

The following description of the female connector component or element 12 is by way of example only as the female connector component 12 may have any suitable shape typically found in quick connectors.

Further, the following description of the use of the quick connector to connect tubular members will be understood to apply to the connection of conduits, hoses, and/or solid metal or plastic tubes to each other in fluid flow communication. The end of a conduit or tubular member inserted into the interior of one end of the quick connect will be defined as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

The present quick connector finds advantageous use with tubular members, such as conduits, tubes, or hoses which are capable of defining a continuous electrically conductive path through the tubular member itself or through a conductive layer or portion of the tubular member. For example, conductive layers have been provided in multi-layer tubes as disclosed in U.S. Pat. Nos. 5,524,673, and 5,743,304. Reference is made to these conductive layers which provide an electrically conductive path from the quick connector of the present invention to a remote electrical ground to dissipate static electric charges which can build up within the fuel system due to fast flowing fluids, such as vehicle fuels.

Figure 5:
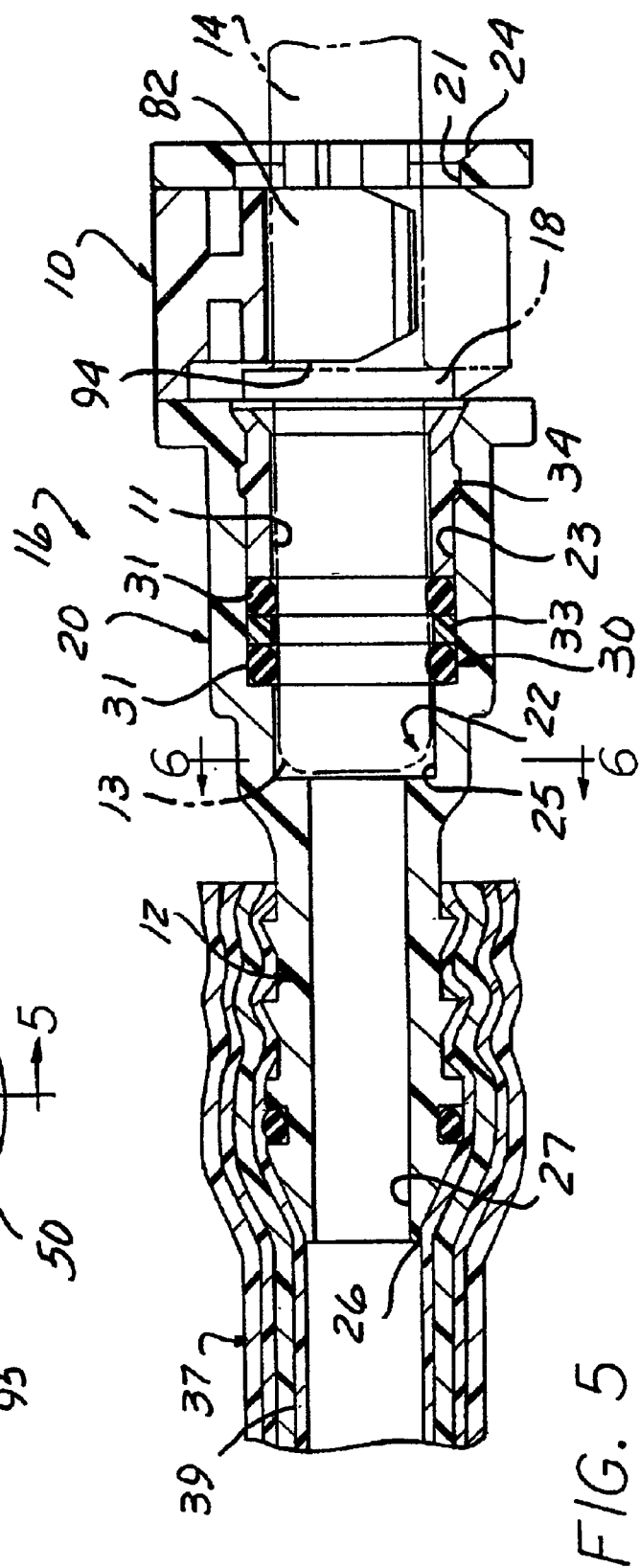
FIG. 5 is a cross sectional view generally taken along line 5—5 in FIG. 4.

The female component 12 includes a housing 20 having an elongated, axially extending, internal stepped bore 22, shown in detail in FIG. 5, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25.

The inner diameter of the first stepped bore portion 21 is sized to slidably receive the outer diameter of the radially enlarged flange or upset bead 18 formed on the male component or fitting 14. Further, the inner diameters of the seal means 30 and the top hat 34 are sized to sealingly engage the outer diameter of the end portion 11 of the male component 14 extending from the radially enlarged flange 18 to the tip end 13 of the male component 14. The third stepped bore portion 25 has an inner diameter sized to snugly engage the outer diameter of the end portion 11 of the male component 14 when the male component 14 is fully inserted into the stepped bore 22 as described hereafter.

Figure 3:
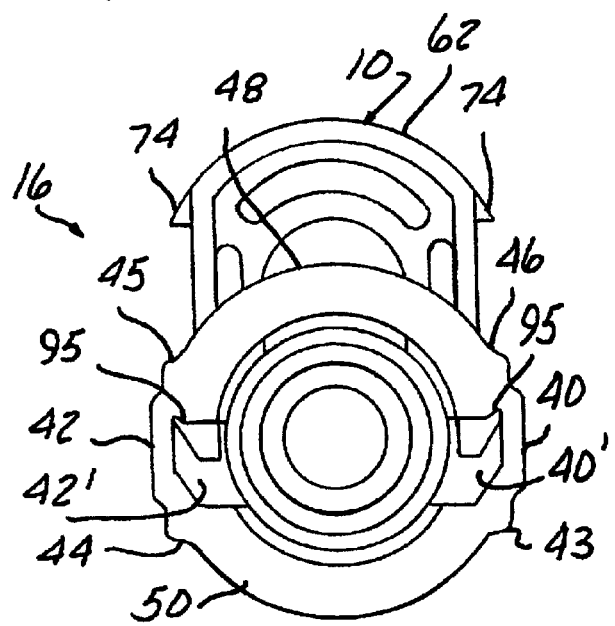
FIG. 3 is an end view of the quick connector and retainer, with the retainer shown in a partially inserted, storage position.
Figure 4:
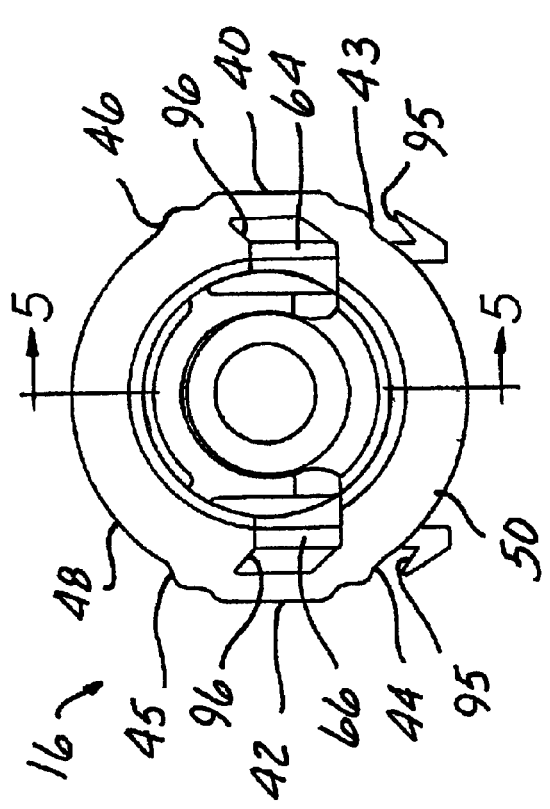
FIG. 4 is an end view of the quick connector and retainer, with the retainer depicted in a fully inserted, position in the female component.

As shown in FIGS. 1, 3, and 4, the first end 24 of the housing 12 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 12 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10, described hereafter, is by way of example only as other radially-displaceable retainer designs having side locking projections may also employ the release tool of the present invention. Alternately, the housing 12 can be reconfigured to receive an axial-type retainer.

The retainer 10 is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 10 between opposed side edges of the side legs 64 and 66, respectively. The projections 70 are located adjacent the outer end 72 of each leg 64 and 66. The projections 70 engage surfaces on the housing 12 to position the retainer 10 in the shipping position shown in FIG. 3, or in the fully inserted, latched position shown in FIGS. 4 and 5.

Further, a pair of outward extending lock tabs or edges 74 are formed adjacent the end wall 62 on each side leg 64 and 66.

As shown in FIGS. 1–5, the retainer 10 includes a radially flange receiving means 80 which is preferably carried as an integral, one-piece part of the retainer 10. The radial flange receiving means 80 includes first and second depending arms 82 and 84 which extend from a boss or enlargement 86 integrally formed on the inner surface of the end wall 62 of the retainer 10. An inverted, U-shaped slot 88 is formed on the inner surfaces of the arms 82 and 84 and the boss 86 which is sized to snugly conform to the outer diameter of the tubular portion 11 of the male component 14. The outer ends 91 of each of the arms 82 and 84 are angled or tapered to act as a guide surface to assist in sliding movement of the arms 82 and 84 over the tubular end 11 of the male component 14.

Figure 2:
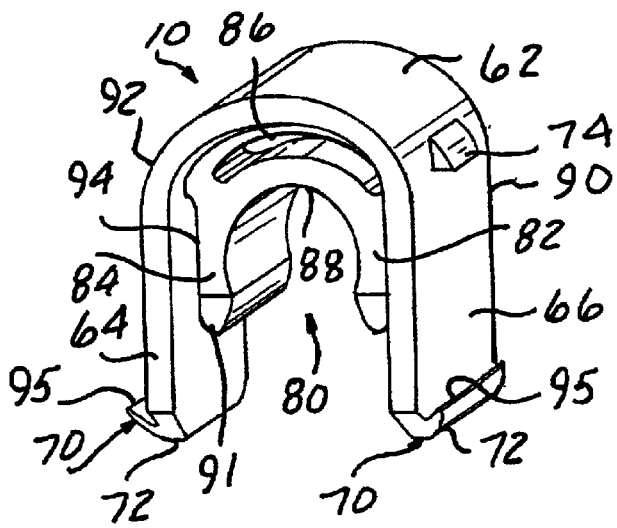
FIG. 2 is an enlarged, left end, perspective view of the retainer shown in FIG. 1.

As shown in FIGS. 1 and 2, each of the arms 82 and 84 extends from one side end contiguous with a first side end 90 of the retainer 10 to an opposed side end contiguous with a second side end 92 of the retainer 10.

As shown in FIGS. 1, 2, 3 and 4, the projections 70 on the legs 64 and 66 of the retainer 10 are formed with an angled hook-like shape terminating in a tip 95. The tip 95 is disposed at an acute, upturned angle with respect to the corresponding legs 64 and 66.

Figure 6:
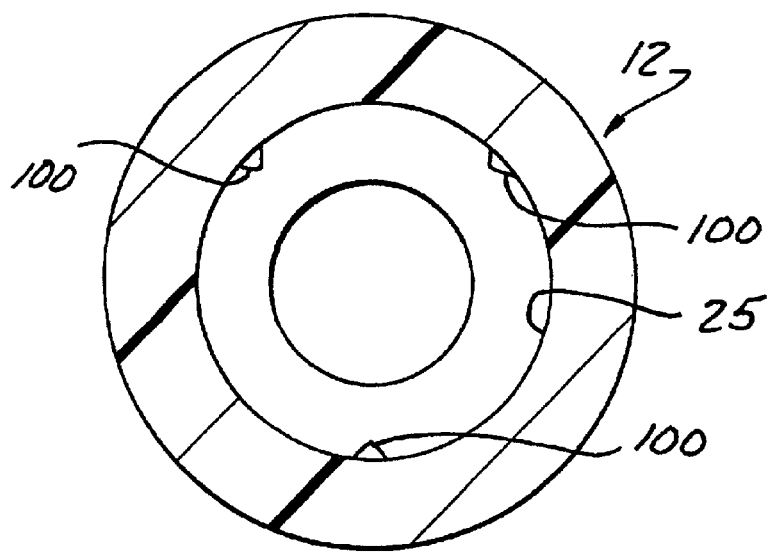
FIG. 6 is a transverse cross-sectional view along line 6—6 in FIG. 5 showing one aspect of a contact member according to the present invention.

Similarly, as shown in FIGS. 3 and 4, and in greater detail in FIG. 6, the grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 10. In this manner, pull out of the retainer 10 from the housing 12 is resisted by the interlocking tips 95 on the legs 64 and 66 of the retainer 10 which are seated within the notches 96 in the grooves 40' and 42' in the housing 12 as shown in the partially inserted, shipping position of the retainer 10 in FIG. 3. The flats or lock edges 44 and 46 are disposed at an angle complimentary to the acute angle of the tips 95 on the legs 64 and 66 of the retainer 10. This enables interlock of the tips 95 with the flats 44 and 46 and resists pull out of the retainer 10 from the housing 12 from the fully latched position shown in FIG. 4.

The hook shaped tips 95 on the legs 64 and 66 of the retainer 10 in conjunction with the grooves 40' and 42' in the housing 12 also provide, a distinct, "avalanche effect" snap action of the retainer 10 in the housing 12. The grooves 40' and 42' in the housing 12 are formed in generally planar flat surfaces. The inner surfaces force the ends 72 of the legs 64 and 66 laterally inward toward each other when the retainer 10 is inserted into the housing 12. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer has lockingly engaged the housing 12 in either the partially inserted position shown in FIG. 3 or the fully inserted position shown in FIG. 4.

It should be noted that further insertion force on the retainer 10 moving the retainer 10 from the partially inserted position shown in FIG. 3 to the fully inserted position shown in FIG. 4 again causes the end 72 of the legs 64 and 66 to be urged laterally inward when the tips 95 of the legs 64 and 66 slide along the lower portion of the inner surfaces. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 10 can be first be installed on the housing 12 in a shipping or storage position as shown in FIG. 3. In this position, the projections 70 on the side legs 64 and 66 of the retainer 10 snap into and engage the longitudinally extending grooves 40' and 42'.

Further insertion of the retainer 10 through the aligned apertures 49 and 51 in the housing 12 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 12 as shown in FIG. 4. In this fully inserted position of the male component 14 in the female component 12, the annular flange 18 on the male component 14 is situated ahead the arms 82 and 84 of the retainer 10. This position represents the fully latched position in which the male component 14 is fully seated in and lockingly engaged with the female component 12. The full insertion of the retainer 10 into the housing 12 also provides visible indication of the fully locked connection of the male and female components 14 and 12, respectively.

It should be noted that if the male component 14 is not fully engaged or seated within the housing 12, the annular flange 18 on the male component 14 will not be properly situated within the transverse bore in the housing 12 to slidably receive the arms 82 and 84 in the retainer 10. If the annular flange 18 on the male component 14 is at any position other than shown in phantom in FIG. 5, the arms 82 and 84 on the retainer 10 will contact the annular flange 18. Since the spacing between the inner surfaces of the legs 82 and 84 is less than the outer diameter of the annular flange 18, the retainer 10 cannot be moved to the fully inserted position thereby providing an indication of an incomplete seating or mounting of the end portion 11 of the male component 14 in the housing 12.

According to one aspect of the present invention, which is shown in detail in FIG. 6, a contact member 100 is disposed within the housing 20 of the female component 12 to provide a secure electrical contact between the conductive male endform 14 and the conductive female component 12. In this aspect, the housing 20 is formed of an electrically conductive material, either by being formed of a conductive metal or, when formed of a plastic, being doped or filled with sufficient electrically conductive particles to render the housing 20 conductive. Likewise, the male endform 14, in this aspect, is also conductive by being made of a conductive metal for a plastic filled with sufficient conductive particles to render the entire male component 14 electrically conductive.

In this aspect, the contact member 100 is in the form of at least one and preferably a plurality of projections, such as three by example only, which are carried on an inner surface of one bore portion, such as bore portion 25 of the housing 20. Preferably the projections 100 are integrally formed with the housing 20 to be a unitary part thereof.

The projections 100 may have any shape, such as a pyramidal, polygonal, curved, etc., shape. The inner diameter between the projections 100 is smaller than the outer diameter of the tip end of the male endform 14.

Due to the location of the projections 100 in the stepped bore portion 25 of the housing 20, only a small portion of the corrosion resistant coating normally provided on the tip end 13 of the male endform 14 is removed by the projections 100 when the endform 14 is inserted into the bore in the housing 20.

During insertion of the male endform 14 into the housing 20, the tip end 13 will engage and slide past the projections 100, with the projections 100 digging in slightly into the exterior surface of the tip end 13 of the male endform 14. This insures a secure electrical connection between the electrically conductive male endform 14 and the electrically conductive housing 20.

Figure 7:
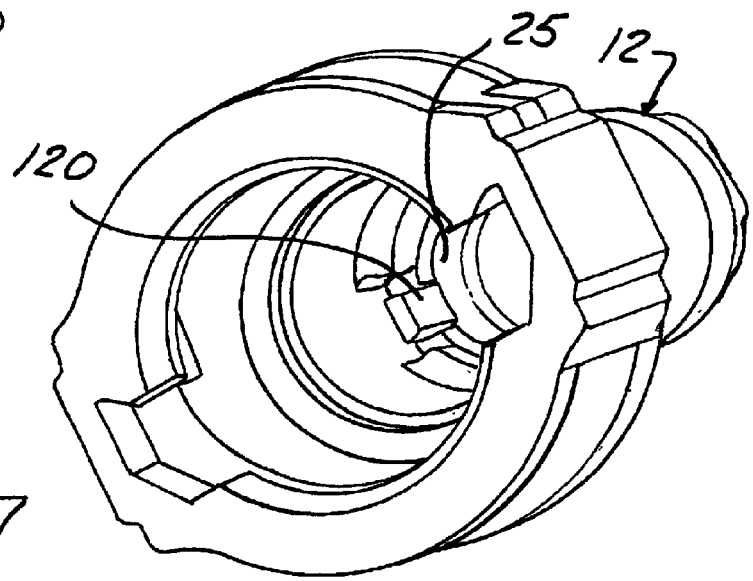
FIG. 7 is a perspective view through the end of the quick connector showing another aspect of a contact member according to the present invention.
Figure 8:
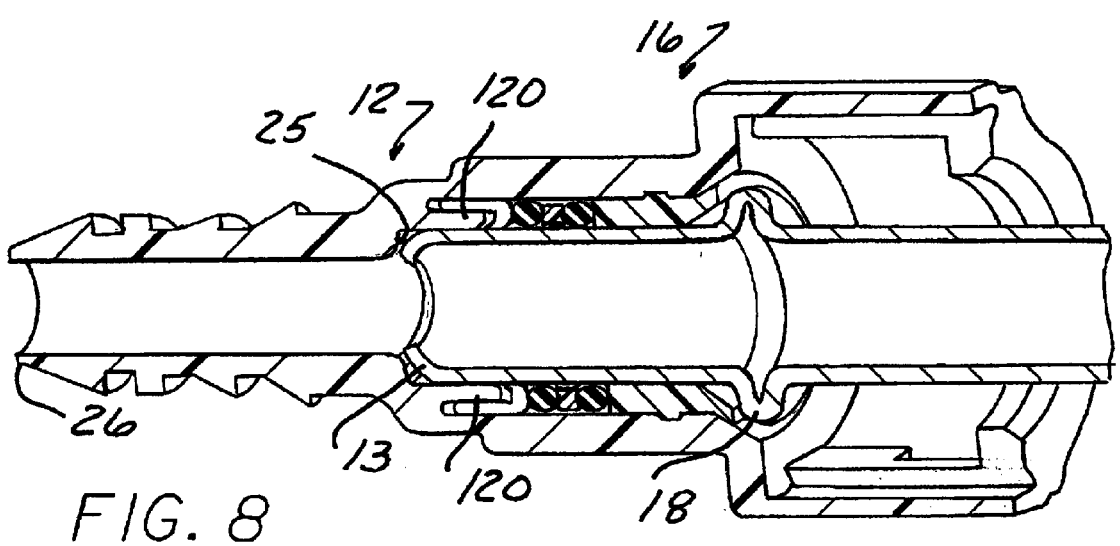
FIG. 8 is a longitudinal cross-section view of the quick connector shown in FIG. 8.

Another aspect of a contact member 120 according to the present invention, is shown in FIGS. 7 and 8. In this aspect of the invention, the contact member or members 120 are in the form of fingers, all referred to by reference number 120, with at least one and preferably a plurality, such as two or more fingers 120 provided. The fingers 120 project from a shoulder separating the stepped bore portion 25 from the stepped bore portion 27 in the housing 20. Each finger 120 has a generally cubicle shape and is spaced from the adjacent inner surface of the stepped bore portion 25 so as to cantilever from its joinder point on the housing 20. The inner diameter between the fingers 120 is slightly less than the outer diameter of the male endform 14.

During insertion of the male endform 14 into the housing 20, the tip end 13 of the male endform 14 will engage and slightly expand the contact fingers 120 radially outward. This applies a pre-load on the contact fingers 120 which insures a secure electrical contact between the contact fingers 120 and the male endform 14. In this manner, a secure, non-intermittent, electrically conductive path is formed between the conductive male endform 14 and the conductive housing 20 to dissipate any static electrical charge build-up in the fuel system.

This electrical connection insures a continuous electrically conductive path through the quick connector 16 which enables any static electrical charge generated by fluid flowing through the connector housing 20 to be dissipated through the quick connector 16 and any connected component, such as the aforementioned multi-layer tube 37 which is provided with an inner electrical charge dissipation conductive layer 39, as shown in FIG. 5.

What is claimed is:

1. A fluid quick connector comprising:
   a connector housing formed of an electrically conductive material and having an axial bore configured internally receive an electrically conductive male endform along a first axis through the bore; and
   a contact member monolithically formed in the housing and disposed in the bore, the contact member and adapted for electrical contact with the male endform when the male endform is inserted into the bore in the housing.

2. The fluid quick connector of claim 1 wherein the contact member comprises:
   at least one finger carried with the housing and extending into the bore in the housing.

3. The fluid quick connector of claim 2 wherein the at least one finger further comprises:
   a plurality of circumferentially spaced fingers carried on the housing.

4. The fluid quick connector of claim 3 wherein the plurality of fingers comprise:
   three equi-circumferentially spaced fingers.

5. The fluid quick connector of claim 3 wherein:
   an inner diameter between the contact fingers is smaller than an outer diameter of the male endform.

6. The fluid quick connector of claim 1 wherein:
   the contact member is positioned in the bore in the housing for engagement with a tip end of the male endform when the male endform is fully inserted into the quick connector housing.

7. The fluid quick connector of claim 1 wherein the contact member comprises:
   at least one projection integral with the housing, the at least one projection extending radially inward into the bore in the housing.

8. The fluid quick connector of claim 7 wherein:
   the at least one projection is integrally formed as a unitary part of the housing.

9. The fluid quick connector of claim 7 wherein the at least one projection comprises:
   a plurality of circumferentially spaced projections carried on the housing.

10. The fluid quick connector of claim 7 wherein the at least one projection comprises:
    three equi-circumferentially spaced projections carried on the housing.

11. The fluid quick connector of claim 8 wherein.
    the contact member is mounted in the bore of the housing to engage a tip end of the male endform when the male endform is fully inserted into the bore in the housing.

12. The fluid quick connector of claim 9 wherein:
    an inner diameter between the projections is less than the outer diameter of the male endform.

* * * * *